United States Patent [19]

Goda

[11] 4,046,291

[45] Sept. 6, 1977

[54] DEVICE FOR PIPETTING AND/OR DILUTING

[76] Inventor: George Goda, 390 First Ave., New York, N.Y. 10010

[21] Appl. No.: 647,106

[22] Filed: Jan. 7, 1976

[51] Int. Cl.[2] .............................................. G01F 11/06

[52] U.S. Cl. .................................... 222/309; 222/379; 222/380

[58] Field of Search .............. 128/218 G, 218 M, 220, 128/234, 235, 236; 222/309, 378, 379, 380, 381, 420, 386

[56] References Cited

U.S. PATENT DOCUMENTS

| | | | |
|---|---|---|---|
| 1,367,008 | 2/1921 | Bessesen | 128/220 |
| 1,563,627 | 12/1925 | Hein | 128/218 M X |
| 1,600,587 | 9/1926 | Hein | 128/218 G |
| 2,550,335 | 4/1951 | Dailey | 222/386 X |
| 2,643,655 | 6/1953 | McKay | 128/220 |

*Primary Examiner*—Robert B. Reeves
*Assistant Examiner*—David A. Scherbel
*Attorney, Agent, or Firm*—Martin Novack

[57] ABSTRACT

A pipetting device which is readily adaptable to serve as a pipetting/diluting device. In accordance with the invention there is provided a tubular body having front and rear ends, the body having a central bore which narrows at the front end thereof to form a tip. A hollow enclosure is provided and defines a back chamber. A plunger is slideable in the bore and extends from the rear thereof for manual activation. The plunger has a front portion which conforms circumferentially to the inner surface of the body, the bore space in the body forward of the plunger defining a front chamber. The plunger has a communicating passage between the back and front chambers. A first one way valve means restricts flow in the communicating passage to occur only from the back chamber toward the front chamber. Finally, a second one way valve means restricts flow as between the front chamber and the tip to occur only from the front chamber toward the tip. In operation, the downward stroke of the plunger forces liquid in the front chamber through the second one way valve means and the liquid is delivered through the tip. When the plunger returns during the upstroke, a vacuum tends to be created in the front chamber since the second one way valve means restricts air from flowing through the tip and into the front chamber. This causes liquid to flow from the back chamber, through the first communicating passage and the first one way valve means into the front chamber, so the front chamber fills as the plunger returns to the top of its stroke. In one embodiment of the invention an auxiliary plunger is mounted on the front end of the plunger and extends into the tip.

19 Claims, 3 Drawing Figures

DEVICE FOR PIPETTING AND/OR DILUTING

BACKGROUND OF THE INVENTION

This invention relates to a dispenser and/or diluter and, more particularly, to a hand-held dispenser which can repeatably deliver a precise quantity of liquid and which can also repeatably collect a precise quantity of a first liquid and then deliver the first liquid diluted with a predetermined amount of a second liquid.

There have been previously devised various types of apparatus for repeatably delivering a precise amount of liquid. Many types of hand-held syringes are capable of this task. However, in most cases it is necessary to refill the syringe after each use or to provide a number of different "stop" positions for the syringe plunger. This latter technique requires special operator control and generally yields only a very limited number of samples for each full stroke of the piston.

Responsive to the need for a repeatable liquid delivery system having the capacity for delivering large numbers of samples without refilling, there have been devised various types of plunger bottle dispensers, examples being disclosed in U.S. Pat. Nos. 3,191,807, 3,430,813, 3,730,398 and 3,741,444. Typically, these units comprise a plunger and a first check valve which allows liquid to pass into a chamber when the plunger is released. A second check valve allows the liquid to be delivered when the plunger is depressed, and a relatively large capacity bottle serves as the source from which liquid is drawn in through the first check valve. This type of bottle dispenser system is found to operate satisfactorily in some applications, but there is a degree of inconvenience associated with the size and bulk of the bottle and the frequent necessity of bringing test tubes or vessels to the vicinity where the bottle is located. It is one object of the invention to provide solutions to these prior art problems as set forth.

Previous techniques have also been devised for repeatably diluting a precise quantity of a first liquid in a predetermined quantity of a diluent liquid. Unfortunately, most of these techniques require relatively complex equipment and/or operations wherein the liquids are separately loaded from different sources or where a relatively bulky equipment is provided with bottle-type sources. Again, single-shot diluters are known, as well as those types wherein an operator is required to manipulate a plunger to different "stop" positions to obtain a desired result. This requires operator dexterity and is subject to human error. Also, those systems which are in the form of hand-held syringes require constant reloading of both types of liquids and are not capable of delivering even moderate numbers of diluted samples without such reloading. It is a second object of the present invention to provide solution to these further prior are problems as set forth.

SUMMARY OF THE INVENTION

The present invention is directed to a pipetting device which is readily adaptable to serve as a pipetting/ diluting device. In accordance with the invention there is provided a tubular body having front and rear ends, the body having a central bore which narrows at the front end thereof to form a tip. A hollow enclosure is provided and defines a back chamber. A plunger is slideable in the bore and extends from the rear thereof for manual activation. The plunger has a front portion which conforms circumferentially to at least a portion of the inner surface of the body, the bore space in the body forward of the plunger defining a front chamber. The plunger has a communicating passage between the back and front chambers. A first one way valve means restricts flow in the communicating passage to occur only from the back chamber toward the front chamber. Finally, a second one way valve means restricts flow as between the front chamber and the tip to occur only from the front chamber toward the tip.

In operation, the downward stroke of the plunger forces liquid in the front chamber through the second one way valve means and the liquid is delivered through the tip. When the plunger returns during the upstroke, a vacuum tends to be created in the front chamber since the second one way valve means restricts air from flowing through the tip and into the front chamber. This causes liquid to flow from the back chamber, through the first communicating passage and the first one way valve means into the front chamber, so the front chamber fills as the plunger returns to the top of its stroke.

In one embodiment of the invention an auxiliary plunger is mounted on the front end of the plunger and extends into the tip. In this embodiment the auxiliary plunger extends through the second one way valve means which is a sleeve-type check valve having a central bore therethrough. Operation of this embodiment is similar so that previously described, except that in this case the action of the auxiliary plunger withdrawing into the tip (as the main plunger travels in its upstroke) will cause liquid, into which the tip has been immersed, to be drawn into the tip. The next downward stroke of the plunger will then dispense the liquid in the tip as well as the diluent liquid which was drawn into the front chamber, thereby achieving a desired dilution.

Further features and advantages of the invention will become more readily apparent from the following detailed description when taken in conjunction with the accompanying drawing.

DESCRIPTION OF THE PREFERRED EMBODIMENT

Figure 1:
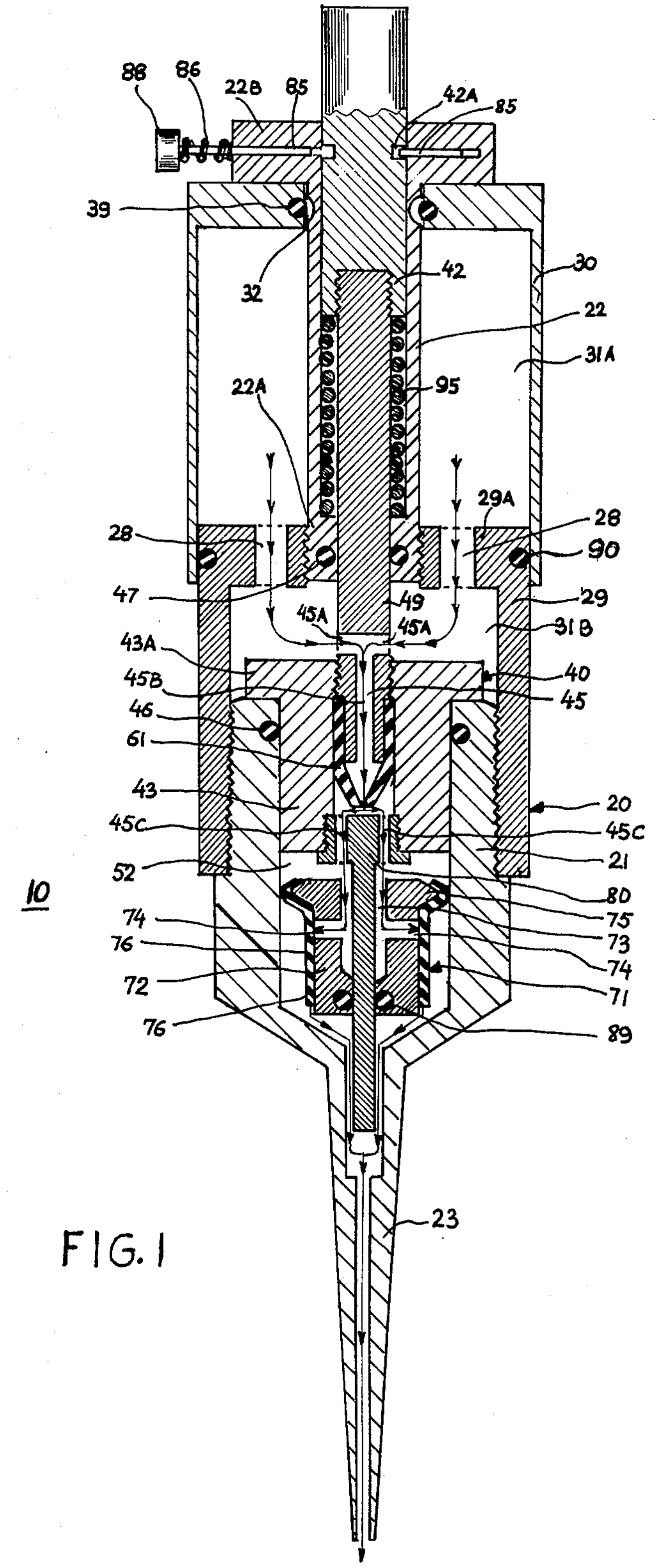
FIG. 1 is a cross-sectional view taken vertically through a device in accordance with an embodiment of the invention.

Referring to FIG. 1, there is shown a pipetting device 10 which is also useful as a pipetting/diluting device. A tubular body 20 has a front end 21, a middle portion 29, and a rear end 22, each of which has a different internal diameter in the present embodiment. The central bore in the body narrows at the front end thereof to form a receiving/dispensing tip 23.

A hollow enclosure 30 is mounted over the rear end 22 of the body 20 and encloses the volume 31A. The forward wall of enclosure 30 is circular plate 29A which comprises the rearmost wall of middle body portion 29. The enclosure 30 is vented to the outside environment at 32. Openings 28 in the plate 29A connect the volume 31A and a volume 31B within the body portion 29, and these connected volumes are collectively defined as a back chamber 31.

A plunger 40 is slideable in the bore in body 20 and extends from the rear thereof for manual activation. The plunger is shown at the bottom of its stroke in FIG. 1 and at the top of its stroke in FIGS. 2 and 3. The plunger 40 has a rear portion 42 which conforms circumferentially to the inner surface of rear end 22 of body 20, a central portion 49 and a front portion 43 which conforms circumferentially to the inner surface of front end 21 of body 20. The bore space in the body 20 forward of the front portion 43 of plunger 40 is defined as a front chamber 52. The plunger 40 has a communicating passage 45 between the back chamber 31 and the front chamber 52. The communicating passage 45 consists of the connected passageways labelled 45A, 45B and 45C in the FIGURE. In the present embodiment the passageways 45A comprise a pair of apertures on opposing sides of the plunger, as shown, and the passageways 45C comprise a pair of apertures in a removeable auxiliary plunger 80, to be described. When the auxiliary plunger is removed, the passageway 45C is merely a continuation of passageway 45B. A one-way valve 61, which may be a lip valve of the type illustrated, is mounted in passageway 45B over an annular flange at the end of plunger central portion 49. The valve 61 allows flow in the communicating passage 45 only from the back chamber 31 toward the front chamber 52.

The front of circular plate 29A defines an upper limit stop surface and the back edge of front end 21 of body 20 defines a lower limit stop surface. The front portion 43 of plunger 40 has a protruding annular flange 43A which engages the upper or lower limit stop surfaces during the plunger stroke to determine the extent of the plunger stroke. A return spring 95 is disposed in the rear body portion 22 surrounding the central portion 45 of the plunger. The back edge of the spring abuts the front edge of the rear plunger portion 42 and the front edge of the spring abuts an inwardly extending flange 22A which forms the front of the body portion 22. Thus, the plunger is normally biased toward the top of its stroke. O-rings 46 and 47 are respectively fitted in annular grooves in the front end 21 and the rear end 22 of the body 20, as shown, to effect sealing of the plunger.

Another one way valve 71 is positioned forwardly in the front chamber 52. The valve 71 is a sleeve-type check valve comprising a cylindrical body 72 having a central bore 73 with small side ports 74. An annular protrusion 75 is provided on the outer surface of the body 72 and a flexible sleeve 76, which may be formed of rubber, surrounds the body 72. The portion of the sleeve outside the protrusion acts as a seal. Fluid in the front chamber 52 can be forced into the tip 23 by passing through the bore 73, ports 74 and then beneath the lower portion of sleeve 76 which is forced out slightly. However, fluid in the tip 23 cannot flow backwards into the chamber 52 since the sleeve will cling to the body 72 in this circumstance.

Figure 2:
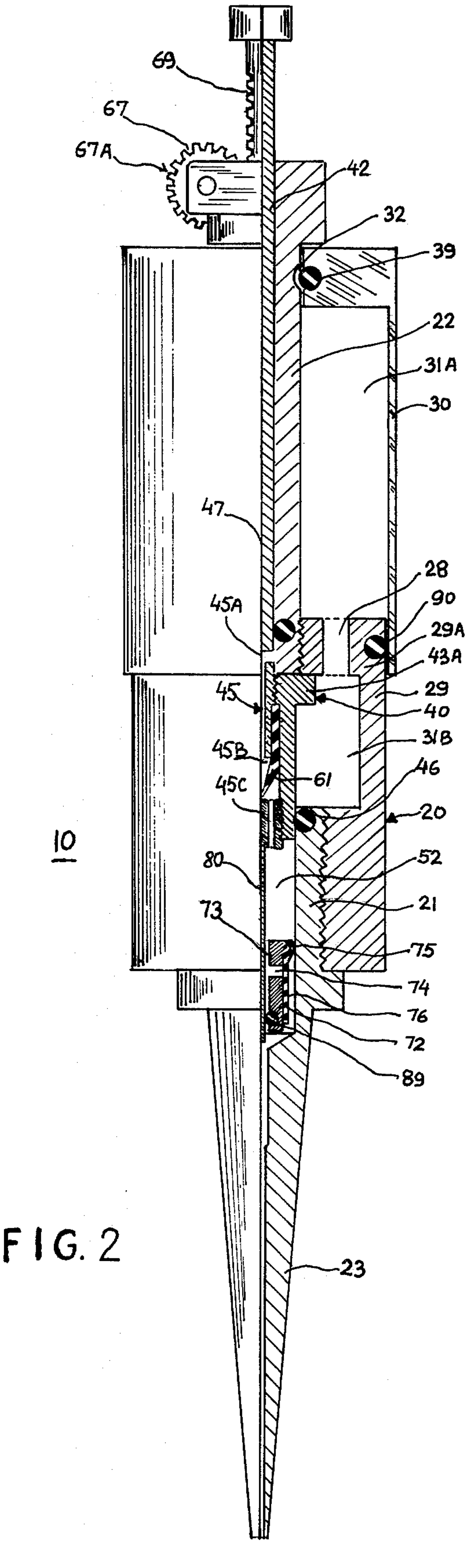
FIG. 2 illustrates a modified version of the embodiment of FIG. 1, shown half in perspective and half in cross section.

Operation of the device as described thus far (and without the auxiliary piston 80 which is described hereinbelow) is as follows: During the down stroke of the plunger, liquid in the front chamber 52 is forced through the check valve 71 and dispensed through the tip 23. The plunger 40 is then returned to its upward position, and during this upstroke a vacuum tends to form in the front chamber 52 since the check valve 71 prevents air or liquid in the tip from entering the front chamber 52. This, in turn, causes liquid to be drawn from the back chamber 31, through the communicating passage 45 and the check valve 61 and into the front chamber 52, thereby filling the front chamber. The dispensing cycle can then be repeated. Liquid flow is illustrated in FIG. 1 by the small arrows. In FIG. 2 the plunger is shown at the top of its stroke.

The amount of liquid dispensed per stroke is a function of the plunger stroke distance and this can be adjusted by modifying the distance between the upper and lower limit stop surfaces screwing or unscrewing the threaded body portions 21 and 29 with respect to each other. The volume 31A provides a relatively large storage, but the unit is still compact and capable of being held in the hand of an operator. This can serve to maintain the liquid in the back chamber at approximately body temperature, which is desirable in certain applications.

The device can readily be operated as a dilutor by providing an auxiliary plunger 80 which is mounted, such as by threading as shown, in the front end of piston 40. The auxiliary plunger 80 is typically much thinner than the plunger 40. It extends through the bore in the body 72 of the check valve 71 and somewhat into the tip 23. A small rubber O-ring 89 is mounted in the bottom of the valve body 72 and serves as a seal for the auxiliary plunger. (It should be noted that in the absence of the auxiliary plunger — i.e., during use as a dilutor — the O-ring 89 can be replaced by a stopper to prevent flow through the center of valve 71.)

In operation of the device 10 as a dilutor, the tip 23 (or a disposable tip — not shown — if desired) is immersed in the liquid to be diluted. The upstroke of the plunger 40 carries the auxiliary plunger up into the tip which, in turn, draws a small amount of liquid into the tip (the volume depending upon the displaced volume of auxiliary plunger). Also during this upstroke diluent liquid from the back chamber 31 is drawn into the front chamber 52 in the manner previously described. A subsequent downstroke will then dispense the drawn up liquid along with the diluent in the front chamber 52, thereby achieving the desired dilution.

The embodiment of FIG. 1 illustrates a feature of the invention wherein the plunger is automatically and releasably maintained at a position which is a relatively small distance from the bottom of its stroke. Specifically, the body portion 22 has an outwardly extending flange 22B at the rear thereof. The flange has a thin slot therein which houses a ring 85 which is coupled to a pin having a head 88. The rear portion 42 of the plunger has a small detent 42A which is engaged by the ring 85. The detent 42A is sufficiently wide, i.e., it has sufficient "play, " to allow the plunger to return a relatively small distance from the bottom of its stroke before the ring locks the plunger from further return on its upstroke. A small coil spring 86 biases the pinhead 88 outward so that the ring 85 will engage the detent 42A at the bottom of each plunger stroke. In operation as a dilutor, when the plunger has been completely depressed (evacuating drawn up liquid along with diluent) the ring 85 will engage detent 42A after the plunger has returned a very slight distance from the bottom of its stroke. This will cause a small amount of air to be drawn into the tip 23. Now, the tip 23 is immersed in the liquid to be diluted and the pin 88 is pressed to release the plunger which returns to the top of its stroke, thereby drawing in the liquid to be diluted. The small amount of air in the tip serves to prevent the liquid to be diluted from contaminating the diluent in the device. The subsequent downstroke of the plunger then dispenses the drawn up liquid along with the diluent in the front chamber 52 to achieve the desired dilution in the manner previously described. A further advantage of the described feature is that the plunger is maintained at essentially the bottom of its stroke and is prepared for the next dilution so that diluent need not be unnecessarily wasted when preparing the device for the next usage.

The embodiment of FIG. 2 illustrates a further technique by which the plunger can be controlled. Specifically, the rear portion 42 of plunger 40 is provided with a rack of teeth 69 which engages a pinion 67 rotatably mounted at the top of body portion 22. The pinion has a thumbwheel 67A thereon which can be utilized to activate the plunger stroke in accurate manner.

Figure 3:
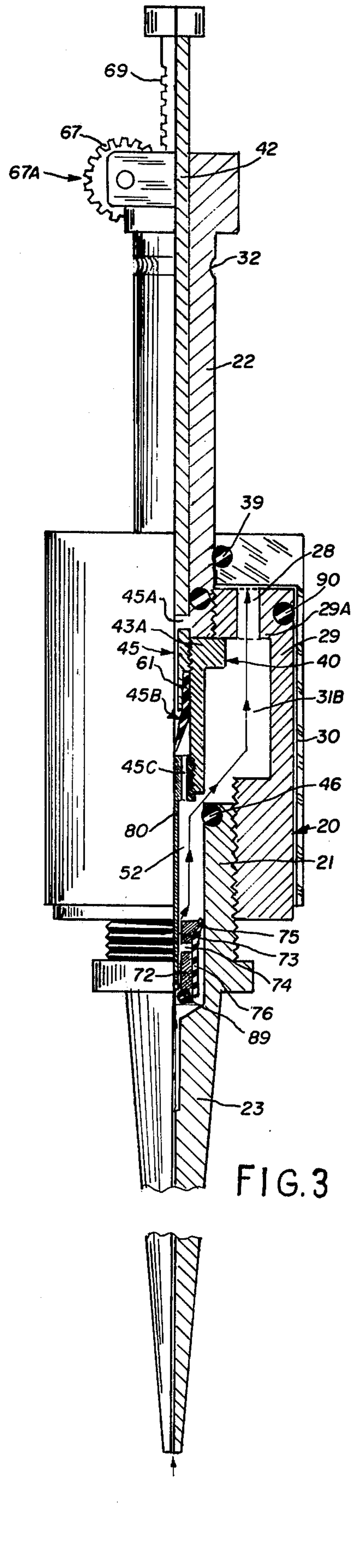
FIG. 3 illustrates operation of the loading feature of the invention.

In accordance with a further feature of the invention, the enclosure 30 is collapsible to facilitate the loading thereof. In the illustrated embodiment, the body 20 comprises axially translatable sections such that bypass of the plunger can be effected during loading. The loading operation is illustrated in FIG. 3. To load, the plunger is extended to the top of its stroke and the body portions 21 and 29 are unscrewed relative to each other so that the bottom of the plunger is above the seal 46, as shown in FIG. 3. Also, this causes the bottom of the auxiliary plunger 80 to rise above the seal 89 in one way valve 71. The enclosure 30 is then collapsed by sliding it down over the body portion 29 as shown in FIG. 3. The tip 23 can then be immersed in the diluent to be loaded and the enclosure 30 is returned to its original position. The vacuum which tends to form in the enclosure draws liquid through the check valve 71 (which is now traversable due to the absence of a seal) and into the volume 31A via the volume 31B, the plunger and its check valve 61 being bypassed. The O-ring 39 seals the enclosure during loading, but when the enclosure 30 returns to its original position the vent 32 is again automatically effective for the normal operating cycle. An O-ring 90 is seated in an external groove in body portion 29, as shown, and provides a lower seal for the enclosure.

There are various ways in which the described structural elements can be formed, and the embodiment of FIG. 1 shows a construction which is essentially of plastic but any suitable material, such as stainless steel, can be employed. The invention has been described with reference to a particular embodiment but variations within the spirit and scope of the invention will occur to those skilled in the art. For example, while particular preferred flow paths have been described, it will be understood that any alternate flow paths which conform to the definition set forth in the claims may also be utilized. Also, it will be understood that the device can be used as a dispenser with auxiliary plunger in place.

I claim:

1. A pipetting/diluting device, comprising:

- a tubular body having front and rear ends, said body having a central bore which narrows at the front end thereof to form a tip;
- a plunger slideable in said bore and extending from the rear thereof for manual activation, said plunger having a front portion which conforms circumferentially to at least a portion of the inner surface of said body, the bore space in said body forward of the plunger defining a front chamber,
- an enclosure defining a back chamber, said enclosure being mounted on said body rearwardly thereof and surrounding said plunger;
- said plunger having a communicating passage between said back and front chambers;
- first one-way valve means restricting flow in said communicating passage to occur only from said back chamber toward said front chamber; and
- second one-way valve means restricting flow as between said front chamber and said tip to occur only from said front chamber toward said tip.

2. The device as defined by claim 1 further comprising an auxiliary plunger mounted on the front end of said plunger and extending into said tip.

3. The device as defined by claim 2 wherein said auxiliary plunger extends through said second one-way valve means.

4. The device as defined by claim 3 wherein said second one-way valve means is a sleeve-type check valve having a central bore therethrough.

5. The device as defined by claim 2 wherein at least a part of said enclosure is temporarily collapsible over said body by sliding said enclosure over said body; said enclosure being loadable during the return thereof to a position rearwardly of said body.

6. The device as defined by claim 5 wherein said body comprises axially translatable sections such that bypass of said plunger can be effected during the loading of said enclosure.

7. The device as defined by claim 6 further comprising means for releasably maintaining said plunger at a position which is a relatively small distance from the bottom of its stroke.

8. The device as defined by claim 2 further comprising means for releasably maintaining said plunger at a position which is a relatively small distance from the bottom of its stroke.

9. The device as defined by claim 1 wherein at least a part of said enclosure is temporarily collapsible over said body by sliding said enclosure over said body; said enclosure being loadable during the return thereof to a position rearwardly of said body.

10. A pipetting/diluting device, comprising:

- a tubular body having front and rear ends, said body having a central bore which narrows at the front end thereof to form a tip;
- an enclosure defining a back chamber;
- a plunger slideable in said bore and extending from the rear thereof for manual activation, said plunger having a front portion which conforms circumferentially to at least a portion of the inner surface of said body, the bore space in said body forward of the plunger defining a front chamber, said plunger having a communicating passage between said back and front chambers;
- an auxiliary plunger mounted on the front end of said plunger and extending into said tip;
- first one-way valve means restricting flow in said communicating passage to occur only from said back chamber toward said front chamber; and
- second one-way valve means restricting flow as between said front chamber and said tip to occur only from said front chamber toward said tip.

11. The device as defined by claim 10 wherein said auxiliary plunger extends through said second one-way valve means.

12. The device as defined by claim 11 wherein said second one-way valve means is a sleeve-type check valve having a central bore therethrough.

13. The device as defined by claim 11 wherein at least a part of said enclosure is temporarily collapsible over said body by sliding said enclosure over said body; said enclosure being loadable during the return thereof to a position rearwardly of said body.

14. The device as defined by claim 13 further comprising means for releasably maintaining said plunger at a position which is a relatively small distance from the bottom of its stroke.

15. The device as defined by claim 10 further comprising a rack of teeth on said plunger and a pinion mounted on the rear end of said body and engaging said teeth.

16. The device as defined by claim 10 wherein at least a part of said enclosure is temporarily collapsible over said body by sliding said enclosure over said body; said enclosure being loadable during the return thereof to a position rearwardly of said body.

17. The device as defined by claim 16 wherein said body comprises axially translatable sections such that bypass of said plunger can be effected during the loading of said enclosure.

18. The device as defined by claim 10 further comprising means for releasably maintaining said plunger at a position which is relatively small distance from the bottom of its stroke.

19. The device as defined by claim 18 further comprising spring means for biasing said plunger to a rearward extending position.

* * * * *